United States Patent [19]

Sano

[11] 4,106,543

[45] Aug. 15, 1978

[54] STRUCTURE OF SEALING AIR VALVES FOR SPLIT RIM TYPE WHEELS

[75] Inventor: Shoichi Sano, Tokorozawa, Japan

[73] Assignee: Honda Giken Kogyo Kabushiki Kaisha, Tokyo, Japan

[21] Appl. No.: 725,953

[22] Filed: Sep. 23, 1976

[30] Foreign Application Priority Data

Oct. 4, 1975 [JP] Japan .......................... 50-135261[U]

[51] Int. Cl.² .................. B60C 23/00; B60C 29/00
[52] U.S. Cl. .................................. 152/405; 152/427
[58] Field of Search ............ 152/427, 396, 402, 403, 152/404, 405

[56] References Cited

U.S. PATENT DOCUMENTS

| | | | |
|---|---|---|---|
| 2,699,810 | 1/1955 | Ferguson | 152/427 |
| 2,871,905 | 2/1959 | Stanton | 152/404 |
| 2,884,042 | 4/1959 | Seaton | 152/404 |

*Primary Examiner*—Robert B. Reeves
*Assistant Examiner*—Charles A. Marmor
*Attorney, Agent, or Firm*—Irving M. Weiner

[57] ABSTRACT

A structure for sealing air valves for split rim type wheels having an outer split rim member with a hole therein passing through a first end surface. The hole is provided with a screw thread. An inner split rim member has a passage therethrough from the periphery to a second end surface which butts with the first end surface of the outer split rim member. A sealing member is disposed in the hole, and an air valve is threadedly engaged in the hole to compress the sealing member against the second surface of the inner split rim member.

6 Claims, 4 Drawing Figures

4,106,543

STRUCTURE OF SEALING AIR VALVES FOR SPLIT RIM TYPE WHEELS

The present invention relates generally to structures of sealing air valves for split rim type wheels using tubeless tires.

More particularly, the present invention relates to a structure of sealing air valves wherein the sealing of an air valve is made simple and positive, the assembly and disassembly of the air valve are simplified, the assembling workability is improved, and maintenance is easy.

BACKGROUND OF THE INVENTION

A split rim type wheel in which the rim is split into two split rim members in the direction of the axle is adopted because the assembly of the tire is simple. However, when a tubeless tire is used on it, the sealing of the jointing surfaces of the split rim members will be a problem, and the sealing of the valve part for injecting air will also be a problem.

In sealing the jointing surfaces of the split rim members, there is taken, for example, a sealing means wherein a projection is made on one or both jointing surfaces, a step part to receive it is made on the other jointing surface, an O-ring is inserted in a clearance made between them and the split rim members are screwed and fastened to each other in the direction of the axle so as to elastically deform said O-ring.

On the other hand, because the air valve is generally provided in the direction of the axle from the outside surface of the rim, the sealing means for the air valve is difficult to seal.

A sealing means is known, for example, such as to make a hole reaching the interior of an inside member from an outside member forming a split rim and to interpose a sealing member in this hole to seal the valve. In case such structure is adopted, when the split rim is shaped by casting, it will be necessary not only to make a through hole in the split rim member on the valve fitting side, but also to form a recess in the other split rim member and to provide a seating part for the sealing member. Therefore, there will be many mechanical steps which are troublesome and complicated. Precision in fitting the recess to the through hole will be required, and excess working steps will be required for the manufacture of the rim. It is also necessary to provide such rim with a passage communicating with the interior of the tire. When such passagerecess and sealing member seating part are formed, the thickness of such part of the rim will become so large as to disadvantageously increase the weight of the wheel. Further, by the above, the air valve must be assembled and sealed simultaneously with the assembling of the split rim members, and the assembling of the tire is therefore difficult to accomplish and is troublesome and complicated. Further, in case the air valve fails and has to be replaced, the valve will not be able to be simply removed and replaced.

SUMMARY OF THE INVENTION

In view of the above problems in sealing an air valve when a tubeless tire is used on a split rim type wheel, the present invention is provided to effectively solve such problems.

An object of the present invention is to provide a structure of sealing air valves wherein an air valve can be sealed as simply and positively as possible, and can be assembled and disassembled simply, and the maintenance of the air valve is easy.

Another object of the present invention is to provide a structure of sealing air valves wherein an air valve can be sealed positively by only drilling and threading steps without requiring such operations as making a seating part and recess for sealing the valve in the rim, and the manufacture of the rim is simplified.

According to the present invention, a passage communicating with the interior of a tubeless tire and an opening on a second end surface jointed with a first end surface of an outside member is made in an inside member forming a split rim type wheel, a screw fitting hole is formed through the outside member, these inside and outside members are connected with each other through fastening screws or the like, and an air valve is screwed through a sealing member at the tip into said screw fitting hole so that the sealing member may be pressed in contact with the tip of the valve and the jointing surface of the inside member opposed to it to seal the valve.

Therefore, according to the present invention, the air valve can be sealed and fitted by being screwed through the sealing member into the screw fitting hole opened on the outside surface of the assembled split rim.

Thus, because the valve is sealed simultaneously with the valve screwing fitting work, the valve sealing work and valve fitting work can be made as simple as possible and, because the valve is fitted after the split rim members are assembled, even after the tire is fitted, the valve can be simply sealed and fitted. Further, the valve can be simply replaced and is very convenient to maintain.

Further, according to the present invention, the air valve can be sealed by providing only one member forming the rim with an air passage and the other member with a screw hole. It is not necessary to specially form a recess or groove for inserting the sealing member for sealing the valve. The shaping of the split rim is simplified and because no recess or groove is provided as mentioned above, it is not necessary to form the jointing part of the rim to the thick, and thus the weight of the wheel can be reduced.

Further, according to the present invention, there can be obtained a structure of sealing air valves wherein, as the air valve is screwed in so that the sealing member may be pressed in contact with the jointing surface of the split rim member by the tip of the air valve, the air valve can be positively sealed. The sealability is excellent, while the fitting is simple.

Preferred embodiments of the present invention shall be explained in detail hereinbelow with reference to the accompanying drawings.

DETAILED DESCRIPTION OF PREFERRED EMBODIMENTS

Figure 1:
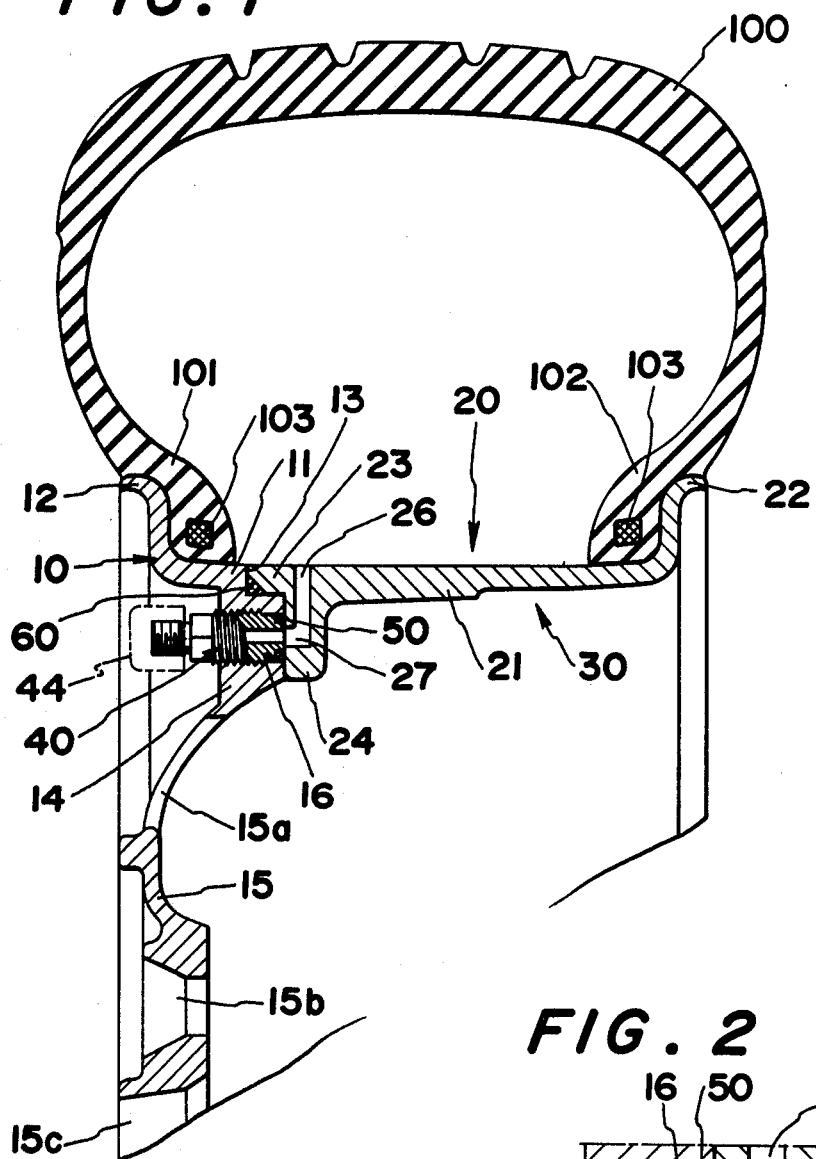
FIG. 1 is a vertically sectioned elevation of a rim part including a tire and air valve.
Figure 2:
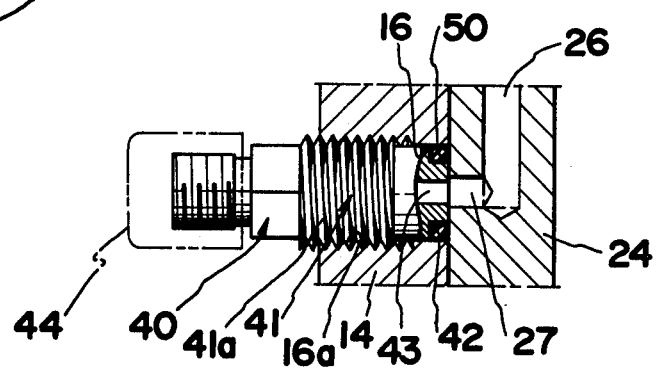
FIG. 2 is a magnified sectioned view of an essential part of FIG. 1.
Figure 3:
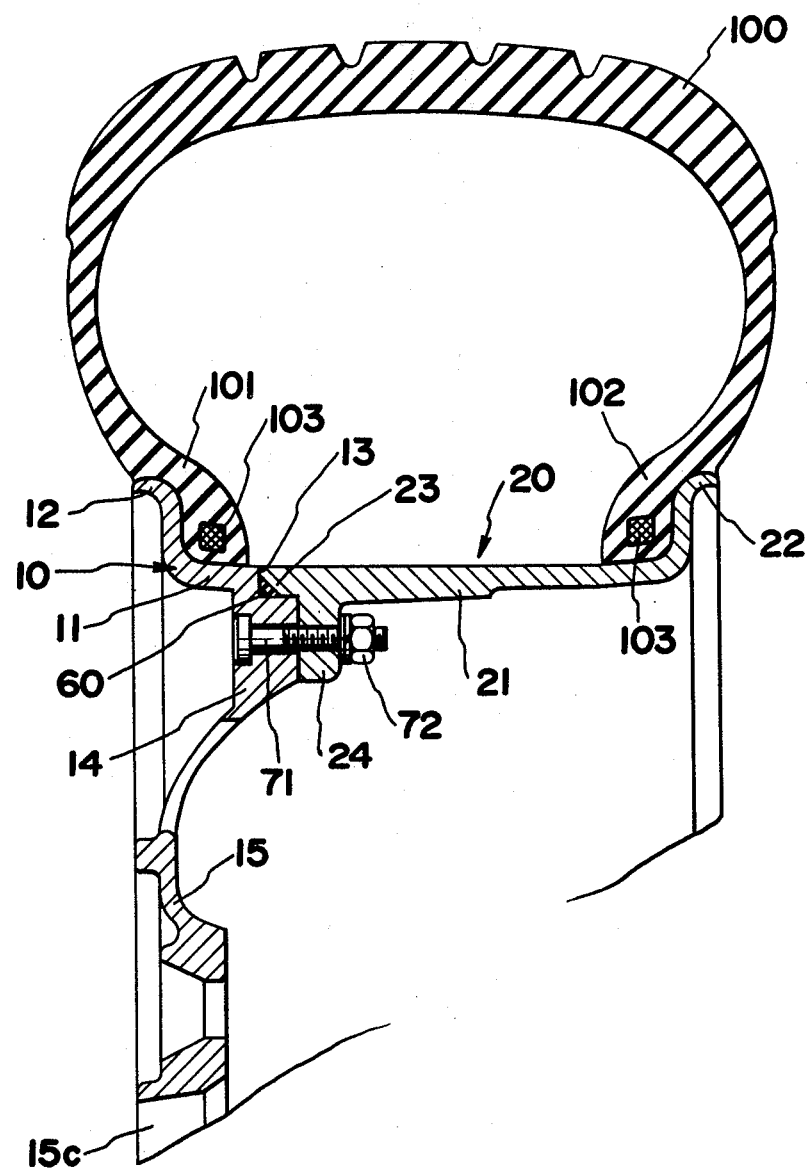
FIG. 3 is a vertically sectioned view of a rim connecting part.

In FIGS. 1 to 3 showing the first embodiment, a rim 30 is split into two members 10 and 20 in the direction of the axle, and is shaped by casting or the like. The split rim member 10 is an outer wheel part appearing outside the car, and the other member 20 is an inner wheel part hidden inside. Ear pieces 12 and 22, which are parts to lock bead parts 101 and 102 on the left and right of a tire 100 by rising upwardly, are integrally formed at the outer ends of the respective split rim members 10 and 20.

Because an air valve is fitted from outside, the length in the direction of the axle of a base part 11 of the outer member 10 is made shorter than the length in the direction of the axle of a base part 21 of the inner member 20. The ear pieces 12 and 22 are provided at the symmetrical outside ends of the respective base parts 11 and 21. The jointing parts of the base parts 11 and 21 of the respective members 10 and 20 are engaged concavo-convexly with each other by making one convex part 23 and a concave part 13. The end edge of the convex part 23 is diagonally cut to form a space which is triangular in cross-section within the concavo-convex engaging part. A sealing member 60, such as an O-ring, is inserted in said space. The split members 10 and 20 are screwed and fastened in the direction of the axle to seal the rim 30 on the periphery. Extensions 14 and 24 are symmetrically formed inwardly in the radial direction on the inner periphery of the butted jointing parts of the split members 10 and 20, are provided over the entire inner periphery of the split members 10 and 20, and are screwed and fastened in the direction of the axle with bolts 71 and nuts 72, as shown in FIG. 3, in a plurality of places radially provided on the periphery.

The extension 14 of the outside split member 10 is shaped as integrally continued with a wheel disc part 15 which is connected with the base 11 as integrally continued with the extension 14 in the peripheral side part. The disc part 15 is provided with windows 15a for weight reduction and decoration, a plurality of radial hub fitting holes 15b, and an axle inserting hole 15c.

A part of the extension 24 of the inside split member 20 is provided with a radial passage 26, opened on the outer periphery at one end to communicate with the space within the tire 100, and closed at the other end so as to be connected in the closed bottom with a communicating passage 27 intersects perpendicularly with the bottom of the passage 26 at the inner end, and opens on the jointing end surface of the extension 24 at the outer end.

In the position of the coincidence of the extension 14 of the outside split member 10 with the communicating passage 27, there is provided a fitting hole 16 of a large diameter opening on the outside surface and passing through the jointing inside surface from the outside surface. A screw is formed in the part toward the outside surface of this fitting hole 16 to form a screw hole part 16a.

An air valve 40 has a male screw 41a formed on the outer periphery of a valve stem 41 and is screwed into the fitting hole 16 in the outside member 10 integrally connected and assembled as illustrated. A step part 42 of a diameter smaller than in other parts is formed in advance in the tip part of the valve stem 41 of the valve 40 so that, when the smaller diameter tip part of the valve 40 contacts the jointing surface of the extension 24 of the inside member 20 in screwing it, a ring-shaped space may be formed between the inner periphery in the bottom of the fitting hole 16 and the tip part of the valve 40. In screwing the air valve 40 into the fitting hole 16, a ring-shaped sealing member 50 is fitted in advance to the periphery of the smaller diameter step part at the tip, and then said valve 40 is screwed into the fitting hole 16. As the valve stem 41 is screwed in, the sealing member 50 at the tip will contact the jointing end surface of the extension 24 of the inside member adjacent a seat portion surrounding the opening of passage 27 on the jointing end surface of extension 24 (FIG. 2), and will be compressed to be deformed between the jointing end surface and the smaller diameter step part 42 to act as a seal. At the same time, an air feeding passage 43 provided within the valve stem 41 of the air valve 40 will coincide and communicate with the communicating passage 27 opening on the jointing surface, and the connecting part of these passages 43 and 27 will be sealed with the sealing member 50 on the outer periphery.

The sealing member 50 has an outside diameter substantially equal to the outside diameter of said stem as fitted to the smaller diameter step part 42 at the tip of the valve stem 41, and is so set as to be larger in the axial direction of valve stem 41 than the length of the smaller diameter step part 42 in the width direction, i.e., the compressing direction.

The air valve can be simply and positively sealed by merely screwing the air valve 40 in with the sealing member 50 interposed after assembling the split rim members 10 and 20 and assembling and fitting the tire.

In the drawings, the reference numeral 44 indicates a cap of the air valve, and 103 indicates a reinforcing member embedded in the tire bead parts 101 and 102.

Figure 4:
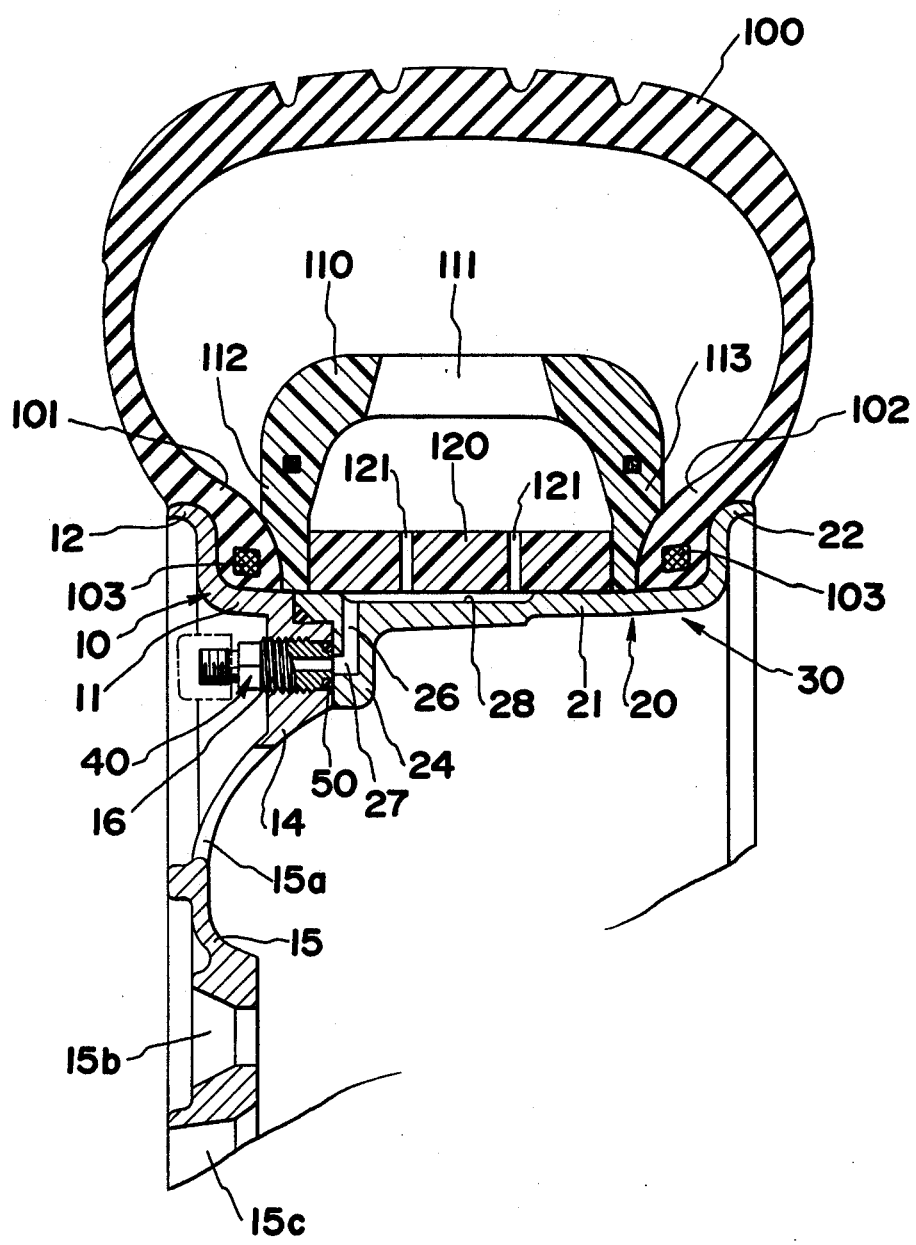
FIG. 4 is a view similar to FIG. 1 of a modified or second embodiment.

FIG. 4 shows a modified embodiment which is fundamentally of the same structure as the first embodiment and in which therefore the same numerals are used for the same respective parts.

In this embodiment, as shown in the drawing, a flat protector 110 and bead stopper 120 are fitted to enclose the rim on the outer periphery within the tire 100 to increase the safety of the tire 100. The flat protector 110 is formed of rubber or the like, is formed to be C-shaped in cross-section, is provided with a plurality of radial holes 111 on the periphery, has leg parts 112 and 113 on both sides in contact with the inside surfaces of the respective tire beads 101 and 102, and has the bead stopper 120 as a spacer inserted on the outer peripheral surface of the rim 30 between the insides of leg parts 112 and 113. This bead stopper 120 is formed of plastics. Therefore, the passage 26 provided within the extension 24 of the split rim member 20 will be closed by the stopper 120.

A groove 28 is formed in the axial direction on the outer periphery of the base part of the split rim member 20 to be present at the opening end of the passage 26, and to form a passage in the axial direction between the bottom surface of the bead stopper 120 and the outer peripheral surface of the rim. Communicating passages 121 are formed in the radial direction in the part corresponding to said groove 28 of the bead stopper 120. In the illustration, two of such passages 121 are provided.

The air fed through the air valve 40 will be fed into the space within the tire 100 through the passage 26, groove 28 and passages 121 in the bead stopper 120. Therefore, even in the tire fitted with the bead stopper 120 or the like, air will be able to be injected without trouble.

According to the present invention, the air valve can be simultaneously fitted and sealed by merely screwing in the air valve through the sealing member after assembling the split rim members 10 and 20 and assembling and fitting the tire. The air valve can be simply replaced by unscrewing and removing it out of the fitting hole, and screwing in a new valve together with a sealing member. Further, as shown from the illustration, in the present invention, it is not necessary to provide the split rim members with a seating part or recess for fitting the sealing member 50. Only a screw fitting hole need be made in one of the split members, and a passage made in the other.

I claim:

1. A structure for sealing air valves for split rim type wheels, comprising:
    an outer split rim member having a hole passing therethrough to and through a first end surface of said outer split rim member;
    a screw thread being provided in at least a portion of the surface of said outer split rim member defining said hole;
    an inner split rim member having a passage therethrough extending from the periphery of said inner split rim member to a second end surface of said inner split rim member which abuts against said first end surface of said outer split rim member;
    an air valve theadedly engaged in said hole, the tip of said air valve butting against said second end surface of said inner split rim member around an opening of said passage on said second end surface of said inner split rim member; and
    a sealing member pre-disposed on said tip of said air valve and being pressed in sealing contact against said second end surface around said opening on said second end surface within a space defined by said second surface, the inner periphery of said fitting hole and the tip of said air valve.

2. A structure according to claim 1, including:
    a wheel rim formed of said two split rim members split in the direction of the axle, and assembled to be integral with one another;
    and wherein:
    said inner split rim member is provided with said passage opening at one end on the outer periphery of said inner split rim member and at the other end on said second end surface of said inner split rim member;
    said outer split rim member is provided with said screw fitting hole made in the direction of the axle;
    said passage opening on said second end surface of said inner split rim member being smaller in size than the opening of said hole on said first end surface of said outer split rim member to thereby provide a seat portion on said second end surface of said inner split rim member; and
    said air valve is screwed into said screw fitting hole with said sealing member interposed at the tip thereof so that said sealing member may be pressed in contact with said seat portion of said second end surface of said inner split rim member, opposed to the tip of said air valve, by said tip.

3. A structure according to claim 2, wherein:
    said split rim member having said passage therein comprises an inner wheel member in the direction of the axle;
    said split rim member having said screw fitting hole therein comprises an outer wheel member; and
    said air valve is screwed through said sealing member into said screw fitting hole opening on the outside surface of the wheel.

4. A structure according to claim 2, wherein:
    a step part of a diameter smaller than the diameter of the valve body is formed at the tip of said air valve;
    a ring-shaped sealing member is fitted to said step part; and
    said valve is screwed into said screw fitting hole.

5. A structure according to claim 2, wherein:
    said inner split rim member having said passage therein is provided on its outer periphery with a groove continued with the opening part on the outer peripheral side of said passage.

6. A structure according to claim 2, wherein:
    a groove is made in the opening part on the outer peripheral side of said passage, and communicating passages are provided in the positions fitting said groove of a spacer member interposed between the beads of a tire fitted to the assembled rim.

* * * * *